3,528,545
Patented Sept. 15, 1970

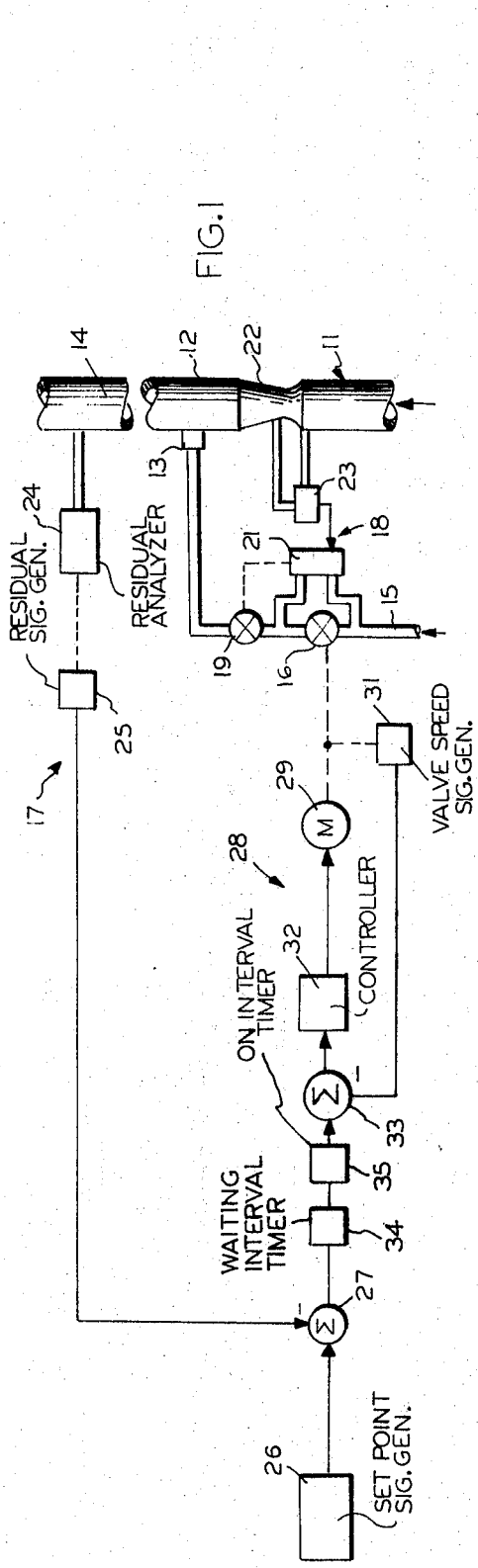
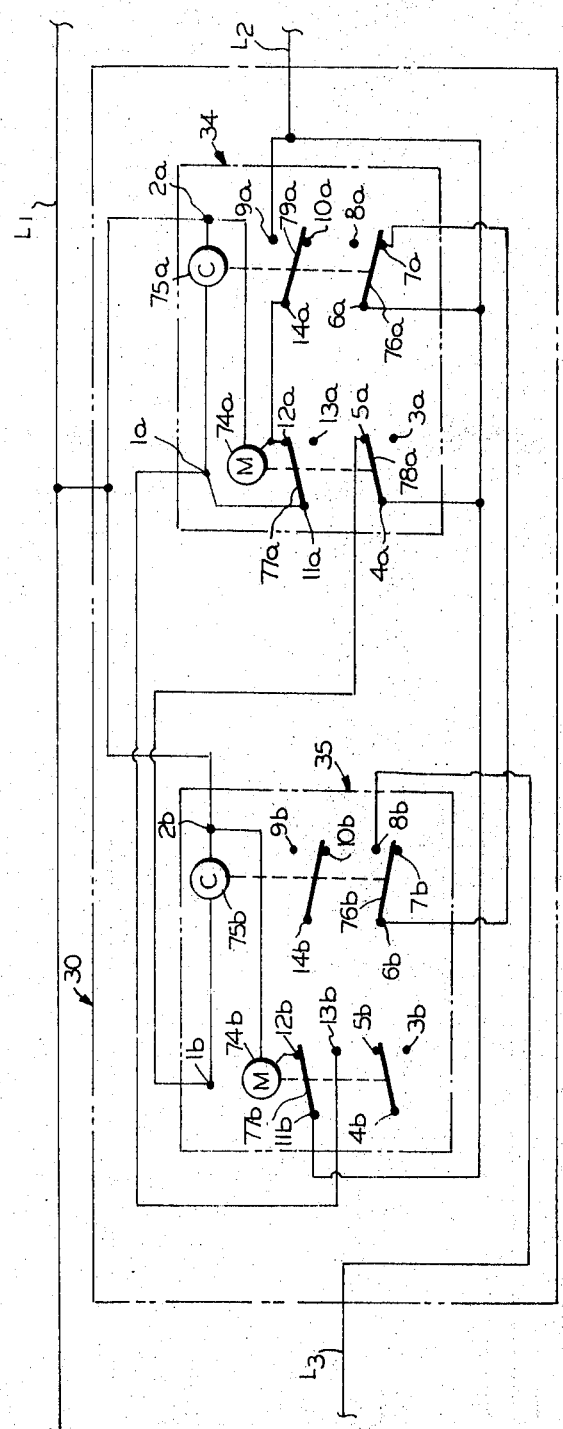

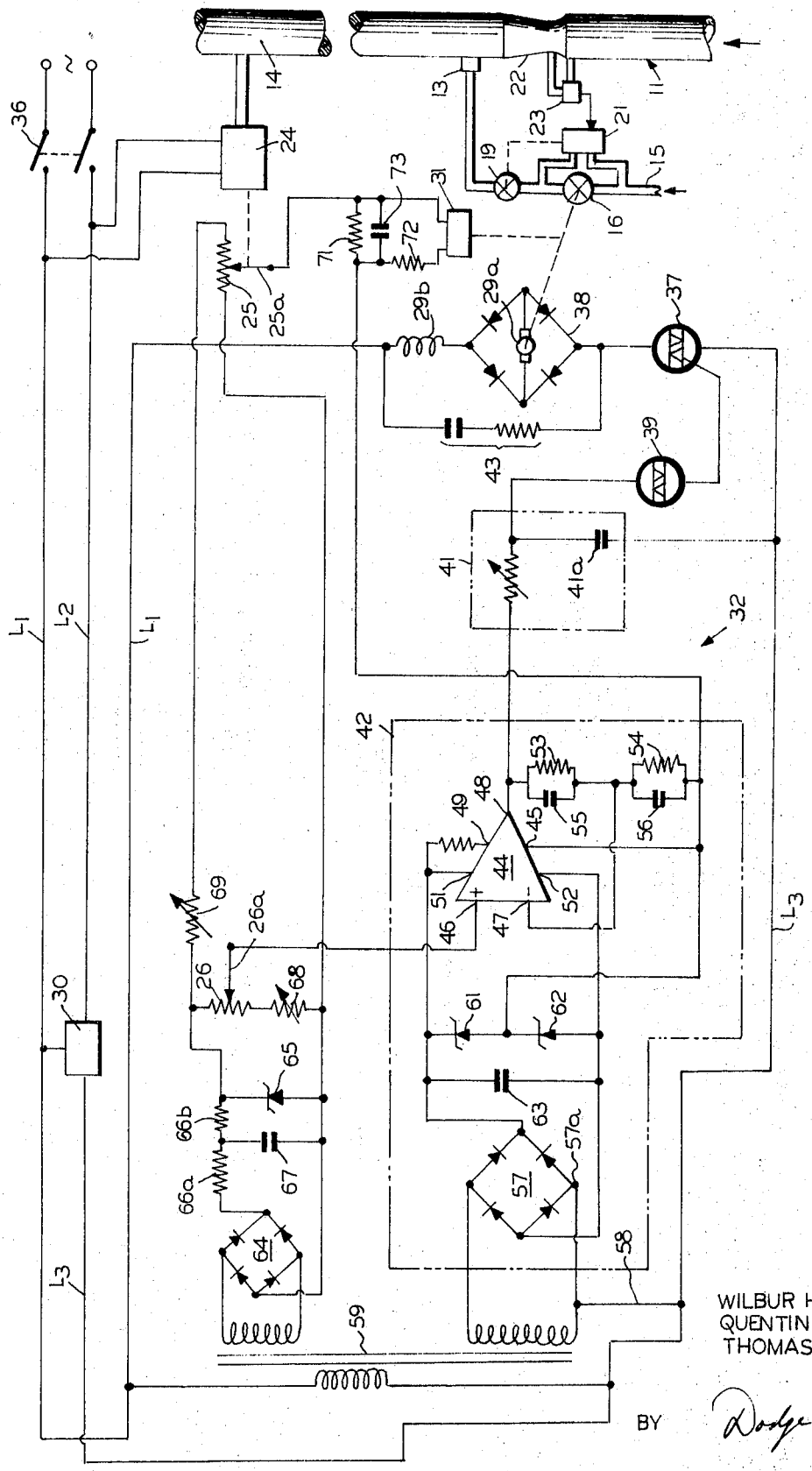

3,528,545
CHLORINE RESIDUAL CONTROLLING SYSTEM
Wilbur H. Frazel, Riverside, Quentin C. Turtle, Cranston, and Thomas Yip, Providence, R.I., assignors to General Signal Corporation, a corporation of New York
Filed Aug. 23, 1968, Ser. No. 754,852
Int. Cl. B01d *43/00*
U.S. Cl. 210—96                                       8 Claims

ABSTRACT OF THE DISCLOSURE

An all-electric system for controlling chlorine residual in a water treatment plant. The system is characterized in that it affords sampled-data, proportional speed floating control action. The system may also afford feedforward action that rapidly changes chlorine feed rate as required to compensate for changes in the flow rate of the stream to be treated.

BACKGROUND OF THE INVENTION

At the present state of the water treatment art, there is no simple, fast, accurate, continuous method for determining the chlorine demand of water which does not already carry a residual amount of chlorine, i.e., unreacted chlorine which remains in the water after the bacteria have been killed. Therefore, practical treatment plants employ a trial and error process in which chlorine is introduced into the raw water at a controlled rate which is adjusted during operation to maintain as closely as possible a preselected level of residual chlorine in the fully treated water. The design of an automatic control system for carrying out this process is made difficult by the fact that the dead time or transport lag within the control loop is large. The predominant component of the dead time is the lag between the change in chlorine feed rate and the resulting change in the measured value of chlorine residual, and this component is inherently large because it takes considerable time for the chlorine to travel from the feed valve to the point of application, to react with the bacteria to effect sterilization, and to travel from the sampling point through the residual analyzer. In practice, dead times on the order of 2 to 30 minutes can be encountered.

Up to the present time, two types of all-electric chlorine residual controlling systems have had commercial significance. The first is a closed loop system affording proportional plus proportional speed floating (reset) control action. In this type of system, the set point signal and the feedback signal representing the actual value of chlorine residual are continuously compared, and the resultant signal is utilized to produce an actuating error signal having one component proportional to the error and a second component proportional to the time integral of the error. The actuating error signal is employed in the closed loop to dictate the position of the chlorine feed-control valve. With this system, the position of the feed valve is changed continuously in an effort to match the set point and feedback signals as long as a difference between the two last mentioned signals exists. However, since the feedback signal at any instant represents the residual produced by the chlorine feed rate which was in effect one dead time earlier, and not the residual corresponding to the current rate of feed, it should be evident that the system is characterized by a severe stability problem. Excessive overshoots or even sustained oscillations of chlorine residual will result unless the reset rate of the controller is so selected that corrective action is effected very slowly. It is not uncommon that systems of this kind require a period equivalent to four or five dead times in order to reestablish the desired chlorine residual after a change in chlorine demand of the water or a change in the set point. This results in either undertreatment of the water or a waste of chlorine depend ing upon whether the chlorine feed rate is too small or too great.

The second commercially significant type of control system is classed as a sampled-data, single-speed floating with neutral system. This system employs a waiting interval timer which effects periodic closure of the control loop and comparison of set point and residual signals at a frequency dependent upon system dead time, and an on interval timer which allows the feed valve to be moved at a fixed speed for a preset length of time in the event the comparison operation develops an error signal of a predetermined size. In other words, during each on interval, the position of the feed valve either is not changed or it is changed a fixed amount independent of the size of the error. If a correction in feed rate is effected and it is just sufficient to produce an acceptable residual level, the error signal will reduce to a value within the neutral zone of the controller during the following waiting interval and no further correction will be made during the next on interval. On the other hand, if the correction is either inadequate or too great, further correction in the same or opposite sense will be effected on a subsequent cycle or cycles. This kind of system must be adjusted so that the magnitude of correction is no greater than the dead band. Otherwise the control system will hunt continuously. While hunting can be reduced by enlarging the neutral zone or reducing the increment of correction effected during each on interval, neither of these approaches is an acceptable solution because the first leads to an excessively large offset, and the second unduly lengthens the time required to correct for large upsets.

It should be mentioned that, on occasion, the sampled-data type of control has been designed to afford two-speed floating action. Although these systems can correct for large upsets more quickly than those affording only single-speed action, they are no better than the latter with regard to errors falling within the slow speed zone.

SUMMARY OF THE INVENTION

The object of this invention is to provide an improved system for automatically controlling chlorine residual which is stable in operation and affords maximum or nearly maximum response speed. According to the invention, the chlorine feed rate is controlled by a sampled-data, proportional speed floating control system. This type of system sizes corrective action to the error and provides a waiting interval of sufficient length to permit the result of that correction to be detected before further corrective action is initiated. The provision of a waiting interval during which the feed valve is at rest prevents overshooting resulting from the use of noncurrent feedback data, which plagues the prior proportional plus reset controller. Moreover, the fact that the control action, when it is undertaken, is proportional to the magnitude of the error precludes the possibility of providing too little correction for large errors or of providing too much correction for small errors. Thus, the improved system eliminates the stability and speed of response problems which characterize the prior sampled-data, single- or two-speed floating controller with neutral. With the new controller, proper correlation between corrective action and error and between sampling period and dead time results in optimum speed of response, narrow dead zone with consequent high sensitivity to error, and good stability.

BRIEF DESCRIPTION OF THE DRAWINGS

The preferred embodiment of the invention is described herein with reference to the accompanying drawings in which:

FIG. 1 is a schematic diagram of the improved controller.

FIG. 2 is a wiring diagram for the preferred controller.

FIG. 3 is a wiring diagram for the timing device employed in the FIG. 2 system.

DESCRIPTION OF THE PREFERRED EMBODIMENT

In the treatment plant illustrated schematically in FIG. 1, the raw water to be treated flows upward through a pipe 11 to a treatment zone 12 in which chlorine is admitted through an injector 13, thence, after an interval sufficient to afford time for the chlorine to react with the bacteria, to a zone 14 in which the chlorine residual is measured. Chlorine gas is supplied to injector 13 through a pipe 15 at a rate regulated by a feed valve 16. The feed valve affords a linear relationship between position and flow rate and is controlled by the improved residual controlling system 17. In accordance with known practice, the plant includes mechanism 18 for controlling the pressure differential across feed valve 16 and thereby eliminating the effect on chlorine feed rate of variations in injector vacuum and chlorine supply pressure. This mechanism includes a throttling valve 19 which is connected in series with valve 16 and is positioned by a differential pressure controller 21 which responds to the pressure drop across the feed valve. Preferably, the injector 13, feed valve 16, throttling valve 19 and controller 21 are incorporated in an assembly, such as the Model 854 or 855 Chlorine Gas Feeder marketed by the BIF Unit of our assignee. Although the set point of controller 21 could be adjusted manually, it is preferred that it be programmed automatically in accordance with the rate of flow of water through pipe 11. This is accomplished easily in the preferred embodiment by providing a flow meter 22 of the differential pressure-producing type, and a transmitter 23 which transduces the output of meter 22 and furnishes a set point-adjusting signal to controller 21. The transducing action of transmitter 23 is linear and so too is the relationship between transmitter output and the set point of controller 21; therefore, chlorine flow rate will vary linearly with the rate of flow of water. This feed-forward control action afforded by mechanism 18 prevents large upsets in the actual value of chlorine residual as a result of changes in water flow rate and thus reduces substantially the size of the errors which controlling system 17 must handle. Since system 17 necessarily is relatively slow acting, because of the inherent, large dead time, this greatly improves the overall performance of the system.

Controlling system 17 includes a residual analyzer 24 which is connected to receive fully treated water from zone 14 and which drives a residual feedback signal generator 25. A suitable analyzer is the Model 0880 Analyzer marketed by the BIF Unit of our assignee. The output of signal generator 25 is combined algebraically with the output of a set point signal generator 26 at summation point 27 to produce an actuating error signal which is fed to a closed loop valve speed-control system 28. This system comprises a motor 29 connected to drive feed valve 16 through a gear train (not shown), a tachometer 31 adapted to produce an output signal which is proportional to valve speed, a motor controller 32, and a summation point 33 at which the feedback signal from tachometer 31 is algebraically combined with the actuating error signal developed at summation point 27. Interposed in the path of the forward controlling elements of system 17 is a pair of timers 34 and 35 which determine the waiting interval and the on interval, respectively, for the system. The waiting interval established by timer 34 is slightly longer than the system dead time in order to insure that the effect on chlorine residual of a change in the position of feed valve 16 will be reflected in the feedback signal from generator 25 before further corrective action is initiated. When timer 34 times out, it turns on timer 35 and thereby allows the actuating error signal to be acted upon in the speed control system 28. The length of time that this system is active depends upon the setting of the on interval timer 35, and this setting is selected to afford the fastest corrective action which can be obtained without overshooting. Optimum performance is realized when a discrepancy between set point and residual attributable either to an upset in chlorine demand or a change in set point is eliminated in one dead time. Although optimum performance usually cannot be realized in actual practice, nevertheless the improved system does afford materially faster response with acceptable stability than the two prior systems mentioned earlier. When timer 35 times out, it renders control system 28 ineffective to produce further changes in chlorine feed rate, and turns on waiting interval timer 34.

When the FIG. 1 plant is in operation and the actual chlorine residual is equal to the desired value, the actuating error signal developed at summation point 27 will be zero. Therefore, when waiting interval timer 34 times out, motor 29 will not run, and the position of valve 16 will remain unchanged throughout the on interval of timer 35 and the subsequent waiting interval of timer 34. On the other hand, if an actuating error signal is present at the instant timer 34 times out, controller 32 will energize motor 29 and cause it to run in a direction corresponding to the sense of the error. The speed at which the motor drives valve 16 will, of course, be proportional to the magnitude of the error. Since the on interval is fixed in length by the setting of timer 35, it necessarily follows that the change in the position of valve 16, and consequently the change in chlorine feed rate, also will be proportional to the magnitude of the actuating error signal. When timer 35 times out, motor 29 and valve 16 will come to rest, and the controlling system 17 will effect no further changes in chlorine feed rate throughout the next waiting interval. As mentioned earlier, the waiting interval provided by timer 34 is selected to insure that the true effect of the change in chlorine feed rate on the sterilization process will be reflected in the actuating error signal before further corrective action is initiated. This insures against overshoots.

When timer 34 again times out, the output of generator 25 will represent the residual produced by the current setting of feed valve 16, and the actuating error signal will be a true measure of the degree of further correction which is required. At this time, system 17 is rendered effective to make a further correction, if one is required, and, as before, the extent of such correction will be proportional to the size of the error. This proportionality between correction and error minimizes the time required to bring the chlorine residual to the desired value.

Although the controlling system 17 depicted schematically in FIG. 1 can take various forms, the embodiment which we prefer is represented by the simplified wiring diagrams of FIGS. 2 and 3. In this embodiment, the system derives power from a pair of lines $L_1$ and $L_2$ which are connected with a 117 volt, 60 Hz. AC source through a master switch 36. Residual analyzer 24 receives power continuously whenever switch 36 is closed, but the power circuit $L_1$, $L_3$ for the remaining components of the system is controlled by the timing device 30 which includes waiting interval timer 34 and on interval timer 35.

The FIG. 2 embodiment employs a valve drive motor of the series type having an armature 29a and a field 29b, and a high gain motor controller of the type described in co-pending application Ser. No. 666,477, filed Sept. 8, 1967. The motor is incorporated in an AC power circuit including leads $L_1$ and $L_3$ and Triac 37, and one of its windings, here armature 29a, is connected across the output junctions of a rectifier bridge 38. Inclusion of the bridge permits reversal of the direction of rotation of the motor. Triac 37 is gated by a Diac 39 which is fired in opposite directions by pulses supplied from an R-C timing network 41. This network receives line-synchronized voltage pulses from an amplifying, pulse generating and regulating unit 42. The output of unit 42 is in the form of a clipped sine wave which, under steady state or zero error conditions, is symmetrical about the zero voltage axis and has an amplitude which enables the network to fire Diac 39 very later in each half cycle. Under transient conditions, unit 42 produces an asymmetrical output wave which is displaced relative to the zero voltage axis an amount and in a direction dependent upon the magnitude and the polarity of the actuating error signal. This effective shift of the output wave causes timing network 41 to fire Diac 39 earlier on half cycles of one polarity and to completely prevent the Diac from firing on the opposite half cycles of the AC power.

The motor used to drive feed valve 16 is small and has relatively high inductance. As known in the art, this characteristic can prevent the fast-acting Triac from performing its intended control function. To guard against this, and also to filter some of the motor noise, it is advisable to connect an R-C couple 43 across the motor windings. It also might be noted here that the complete system should include limit switches, usually incorporated in bridge 38, which open the power circuit through the motor when feed valve 16 reaches its fully open and closed positions, respectively.

The amplifying, generating and regulating unit 42 includes an operational amplifier 44 having a common connection 45, positive and negative input connections 46 and 47, respectively, an output connection 48, a trim connection 49, and power supply connections 51 and 52. The amplifier is provided with a minor feedback path containing resistor 53, and a second resistor 54 is interposed in the circuit of negative input connection 47. The ratio of the values of these resistors determines the steady state gain of amplifier 44, and, for best performance, the gain should be high. A gain of 150 has proven satisfactory. Gain resistors 53 and 54 are shunted by capacitors 55 and 56, respectively, which are sized to provide the degree of lead-lag compensation required for stable operation. This combination amplifying and lead-lag compensation network is the subject of co-pending application Ser. No. 665,886, filed Sept. 6, 1967.

DC power is supplied to operational amplifier 44 by a rectifier bridge 57 whose lower input junction 57a is tied to line $L_3$ by a jumper 58. This connection insures that the output pulses of unit 42 will have the proper DC level with respect to line $L_3$. The bridge 57 receives power from one of the secondary windings of a transformer 59 whose primary is connected across the lines $L_1$ and $L_3$. The output voltages of bridge 57 are regulated by a pair of Zener diodes 61 and 62 interposed between common connection 45 and the positive and negative power supply connections 51 and 52, respectively. A smoothing capacitor 63 connected across the output junctions of the bridge filters the power delivered to amplifier 44.

The set point and residual feedback signal generators 26 and 25 in FIG. 2 are potentiometers whose windings are connected in different legs of a bridge type summing circuit which is supplied with DC power from rectifier bridge 64. The rectifier bridge is energized from a secondary winding of transformer 59 and its output is regulated by Zener diode 65. A pair of resistors 66a and 66b act as current limiters for the Zener diode and, with capacitor 67, form a filter for the DC power supplied to the positive input connection 46 of operational amalso includes an adjustable resistor 68 which compensates for the zero point adjustment of generator 25, and a second adjustable resistor 69 which allows the scales of the two potentiometers 25 and 26 to be matched. The wiper 26a of set point potentiometer 26 is joined directly to the positive input connection 46 of operational amplifier 44, and the wiper 25a of the residual potentiometer 25 leads to the common connection 45 through a resistor 71 across which tachometer 31 develops a voltage proportional to the speed at which valve 16 is moved. Resistor 71 and its companion resistor 72 are employed to reduce the voltage generated by tachometer 31 to the level required for proper operation, and resistor 71 in combination with capacitor 73 serves to filter the commutator noise produced in the tachometer.

During the waiting interval of the system, timing device 30 opens the circuit interconnecting lines $L_2$ and $L_3$, and neither the signal generators 25 and 26 nor the motor controller 32 will be energized. Therefore, the controlling system is prevented from changing the setting of feed valve 16. On the other hand, when power is applied to line $L_3$, all components will be energized, and the system will effect whatever corrective action the current value of the actuating error signal dictates. If the voltages at potentiometers 25 and 26 are balanced, the error signal will be zero. Consequently, the voltages at the output and common connections 48 and 45 of operational amplifier 44 will be equal, and unit 42 will supply timing network 41 with a symmetrical wave. During each half cycle of the AC power, capacitor 41a will be charged in one direction or the other, but the voltage across the capacitor will not reach the breakover voltage of Diac 39 until very late in the half cycle. When the breakover voltage of Diac 39 is reached, Diac 39 will deliver a high-current, short-duration pulse to the gate of Triac 37. Under this condition, Triac 37 will be conductive for a very short time on both the positive and negative half cycles and allow both positive and negative currents to flow through the motor windings. As a result, motor 29 will dither, i.e., tend to rotate in opposite directions on succesive half cycles.

If, at the instant power is applied to line $L_3$, the output of potentiometer 26 is greater than the output of potentiometer 25, thus indicating that chlorine residual is below the desired value, the actuating error signal applied to operational amplifier 44 will instantly cause the latter to raise the voltage at output connection 48 relative to that at common connection 45. This has the effect of shifting the output wave of unit 42 so that the magnitudes of the positive and negative pulses are increased and decreased, respectively. Now, on each half cycle in which line $L_1$ is positive with respect to line $L_3$, capacitor 41a will be charged to the breakover voltage of Diac 39 much earlier in the half cycle. As a result, Triac 37 will be rendered conductive for a substantial portion of each positive half cycle, and current will flow through the motor windings in the direction of lead $L_3$. On the negative half cycles, i.e., when line $L_3$ is positive with respect to line $L_1$, capacitor 41a will not be charged to the breakover voltage of Diac 39, and Triac 37 will remain nonconductive. Since, under these conditions, the motor receives power only on positive half cycles, it will commence to rotate in the direction which effects opening of valve 16. Inasmuch as amplifier 44 has a high grain, the error signal may initially cause it to operate in the saturating mode. However, as soon as the motor commences to run, tachometer 31 will generate a feedback voltage which, in the summation circuit, opposes the actuating error signal. The rate of increase of the feedback voltage is high and, therefore, the net input to amplifier 44 will very quickly reduce to a relatively small value, and the amplifier will operate in the nonsaturating mode. The overall effect of the controller is to cause the motor to accelerate practically instantaneously to a speed proportional to the magnitude of the actuating error signal. The motor will run at this speed for the entire on interval and, as a result, the position of feed valve 16 will change an amount proportional to the size of the error signal. At the end of the on interval, the connection between lines $L_2$ and $L_3$ will be opened by timing device 30, the system components, other than the residual analyzer 24 and timing device 30, will be de-energized, and the motor and valve 16 will come to rest.

In cases where chlorine residual is higher than the desired value at the instant power is applied to line $L_3$, an actuating error signal of opposite polarity will be applied to amplifier 44, and the voltage at output connection 48 will be reduced below that at common connection 45. Now, the output wave delivered to network 41 shifts to the negative side of the zero voltage axis, and Diac 39 fires only on the negative half cycles. Therefore, Triac 37 will be rendered conductive only in the direction of line $L_1$, and the direction of current flow through field winding 29b will be the reverse of what it was in the preceding case. As a result, the motor will now move valve 16 in the closing direction. The speed at which the valve 16 is moved will, as before, be proportional to the magnitude of the actuating error signal.

The wiring diagram for the timing device 30 of the preferred system is illustrated in FIG. 3. In this device, the waiting interval and on interval timers 34 and 35, respectively, are adjustable, synchronous motor-driven interval timers of the reset type. A suitable timer is the Type 305–B Atcotrol timer marketed by Automatic Timing & Controls, Inc., of King of Prussia, Pa. Although the two timers are substantially identical, they have different ranges of settings. In a typical case, timers 34 and 35 afford maximum timing periods of 30 minutes and 15 seconds, respectively. The terminals of the two timers are identified in accordance with the manufacturers data, but the postscrips $a$ and $b$ have been added in the interests of clarity.

When master switch 36 is open, the motors 74a and 74b and the clutch solenoids 75a and 75b of the two timers are deenergized, and the contacts assume the illustrated positions. Incidentally, these are the positions the contacts take when the timers are reset. As soon as the master switch is closed, power is applied to motor 74b through terminals 2b, 12b and 11b, and to clutch solenoid 75b through terminals 2b and 1b of timer 35, and terminals 5a and 4a of timer 34. This starts on interval timer 35 running and causes contact 76b to shift onto terminal 8b. The power circuits for motor 74a and clutch solenoid 75a are open at this time, so timer 34 is idle, and its contacts remain in the illustrated positions. Therefore, lines $L_2$ and $L_3$ are interconnected through terminals 6a, 7a, 6b and 8b, and the controlling system is energized to effect corrective action.

When on interval timer 35 times out, contact 77b disconnects terminal 11b from terminal 12b and connects the former with contact 13b. This action has three important effects. First, it interrupts the power circuit for motor 74b and causes timer 35 to stop. Second, it completes a power circuit for motor 74a through terminals 2a, 12a, 11a, 1a, 13b and 11b, and starts timer 34. Finally, it completes a power circuit for clutch solenoid 75a through terminals 2a, 1a, 13b and 11b, and thereby causes the solenoid to shift contact 76a away from terminal 7a and interrupt the power connection between lines $L_2$ and $L_3$. Thus, at the instant on interval timer 35 times out, this timer stops, waiting interval timer 34 starts, and the controlling system is de-energized. These conditions prevail throughout the timing period of timer 34.

When waiting interval timer 34 times out, contact 77a shifts from terminal 12a to terminal 13a, and contact 78a shifts from terminal 5a to terminal 3a. The effect of this action can be traced as follows:

(a) The downward shift of contact 77a opens one of the two parallel power circuits for clutch solenoid 75a (namely, the circuit through terminals 2a, 1a, 11a, 12a, 74a (namely, the circuit through terminals 2a, 12a, 11a, 14a and 9a), and one of the two power circuits of motor 1a, 13b and 11b).

(b) The downward shift of contact 78a opens the power circuit of clutch solenoid 75b in timer 35 and thereby causes this timer to reset.

(c) The upward or reset movement of contact 77b opens the connection between terminals 11b and 13b and thereby interrupts the remaining power circuit of clutch solenoid 75a. As a result, this solenoid is de-energized, and contacts 76a and 79a move down to their illustrated positions.

(d) Opening of the connection between terminals 9a and 14a in timer 34 interrupts the remaining power circuit of motor 74a; therefore, this timer stops and, since solenoid 75a is de-energized, it resets.

(e) The upward or reset movements of contacts 78a and 77b complete the power circuits of clutch solenoid 75b and motor 74b, respectively, so contact 76b is moved onto terminal 8b, and timer 35 commences to run.

(f) Since terminals 6a and 7a of timer 34 are now interconnected through contact 76a, and terminals 6b and 8b of timer 35 are interconnected through contact 76b, power is again delivered to line $L_3$.

From this outline, it should be evident that, when timer 34 times out, it stops and resets, timer 35 resets and then starts, and the controlling system is once again rendered effective to make a correction in the chlorine feed rate, if such correction is required.

It should be evident that the system will continue to cycle in the manner just described as long as master switch 36 remains closed.

While we have described in detail one specific embodiment of the inventive concept, it should be understood that the following claims provide the true measure of the scope of the invention.

We claim:
1. In a water treatment plant which includes means (15) for feeding chlorine into a main water stream, feed control means (16) for varying the rate of feed of the chlorine, and analyzing means (24) for measuring the residual chlorine in the treated water of the main stream, and wherein there is an inherent time lag between a change in the setting of the feed control means and the resulting change in the measurement made by the analyzing means, the improvement which comprises automatic chlorine residual control means (17) for correcting the setting of the feed control means (16) and which includes
 (a) means (26) producing a set point signal indicative of a desired value of said residual;
 (b) feedback means (25) connected to be operated by the analyzing means (24) and producing a feedback signal indicative of the actual value of said residual;
 (c) summation means (27) connected to receive and algebraically combine said signals to produce an error signal;
 (d) means (28, 29) connected to receive the error signal and manipulate the feed control means (16) at a rate proportional to said signal; and
 (e) timing means (34, 35) which permits said manipulation of the feed control means to occur only periodically at regular intervals and then for only a fixed, predetermined length of time, the time between said intervals corresponding to said time lag of the plant.

2. The improved treatment plant defined in claim 1 in which the means which manipulates the feed control means comprises (a) motor means (29) connected to manipulate the feed control means (16);
(b) second feedback means (31) connected to be operated by the motor means and producing a second feedback signal indicative of the speed and direction of operation of the motor means;
(c) additional summation means (33) connected to receive and algebraically combine the error and second feedback signals to produce a resultant signal; and
(d) a high gain controller (32) connected to receive said resultant signal and operate the motor means (29) in accordance therewith.

3. The improved treatment plant defined in claim 2 in which
(a) the set point and first feedback signal-producing means (26, 25) are power modifiers which produce signals only when they are supplied with power; and
(b) the timing means (34, 35) selectively controls the transmission of power to said two signal-producing means.

4. The improved treatment plant defined in claim 2 in which the timing means (34, 35) selectively controls the transmission of power to the high gain controller (32) and thereby determines the ability of the latter to operate the motor means (16).

5. The improved treatment plant defined in claim 2 in which
(a) the set point and first feedback signal-producing means (26, 25) are power modifiers which produce signals only when they are supplied with power; and
(b) the timing means (34, 35) performs its stated function by selectively transmitting power to the high gain controller (32) and the set point and first feedback signal-producing means (26, 25).

6. The improved treatment plant defined in claim 3 in which the timing means comprises
(a) two power-operated timers (34, 35) having preselected timing periods of different lengths;
(b) circuit means interconnecting the timers in such manner that as each reaches the end of its timing period it stops and starts the other running, whereby the timers run alternately; and
(c) switching means (76a, 76b) controlled by the timers and arranged to transmit power to the set point and first feedback signal-producing means (26, 25) only during the shorter of the two timing periods.

7. The improved treatment plant defined in claim 4 in which the timing means comprises
(a) two power-operated timers (34, 35) having preselected timing periods of different lengths;
(b) circuit means interconnecting the timers in such manner that as each reaches the end of its timing period it stops and starts the other running, whereby the timers run alternately; and
(c) switching means (76a, 76b) controlled by the timers and arranged to transmit power to the high gain controller (32) only during the shorter of the two timing periods.

8. The improved treatment plant defined in claim 5 in which the timing means comprises
(a) two power-operated timers (34, 35) having preselected timing periods of different lengths;
(b) circuit means interconnecting the timers in such manner that as each reaches the end of its timing period it stops and starts the other running, whereby the timers run alternately; and
(c) switching means (76a, 76b) controlled by the timers and arranged to transmit power to the high gain controller (32) and the seat point and first feedback signal-producing means (26, 25) only during the shorter of the two timing periods.

References Cited
UNITED STATES PATENTS

| | | | |
|---|---|---|---|
| 2,251,149 | 7/1941 | Merckel | 210—62 |
| 2,269,393 | 1/1942 | Crampton | 210—62 |
| 2,382,734 | 8/1945 | Marks | 210—62 X |
| 2,999,797 | 9/1961 | Campbell | 210—96 X |

JOHN W. ADEE, Primary Examiner

U.S. Cl. X.R.

210—138